United States Patent
Huang

(10) Patent No.: US 9,927,544 B2
(45) Date of Patent: Mar. 27, 2018

(54) ROTATING SENSOR MECHANISM FOR SEISMIC WHILE DRILLING SENSORS

(71) Applicant: Halliburton Energy Services, Inc., Houston, TX (US)

(72) Inventor: Wei Hsuan Huang, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 121 days.

(21) Appl. No.: 15/037,565

(22) PCT Filed: Dec. 31, 2013

(86) PCT No.: PCT/US2013/078459
§ 371 (c)(1),
(2) Date: May 18, 2016

(87) PCT Pub. No.: WO2015/102610
PCT Pub. Date: Jul. 9, 2015

(65) Prior Publication Data
US 2016/0291190 A1     Oct. 6, 2016

(51) Int. Cl.
| | | |
|---|---|---|
| G01V 1/40 | (2006.01) | |
| G01V 1/50 | (2006.01) | |
| E21B 47/01 | (2012.01) | |
| E21B 47/16 | (2006.01) | |
| E21B 49/00 | (2006.01) | |
| E21B 47/12 | (2012.01) | |

(52) U.S. Cl.
CPC ............... *G01V 1/50* (2013.01); *E21B 47/01* (2013.01); *E21B 47/16* (2013.01); *E21B 49/003* (2013.01); *G01V 1/40* (2013.01); *E21B 47/12* (2013.01); *G01V 2210/1429* (2013.01)

(58) Field of Classification Search
CPC ............. G01V 1/40; G01V 1/50; E21B 47/02
See application file for complete search history.

(56) References Cited

U.S. PATENT DOCUMENTS

| | | | | |
|---|---|---|---|---|
| 5,170,377 | A * | 12/1992 | Manzur | G01V 1/306 367/21 |
| 5,747,750 | A * | 5/1998 | Bailey | G01S 5/20 175/50 |
| 5,771,170 | A * | 6/1998 | Withers | G01V 1/008 702/14 |
| 5,917,160 | A | 6/1999 | Bailey | |
| 7,588,082 | B2 | 9/2009 | Lasater | |
| 2002/0011378 | A1* | 1/2002 | Bailey | G01V 1/16 181/108 |
| 2002/0062992 | A1 | 5/2002 | Fredericks et al. | |
| 2005/0224257 | A1* | 10/2005 | Ekseth | E21B 47/022 175/45 |

(Continued)

OTHER PUBLICATIONS

International Search Report dated Sep. 29, 2014, issued in corresponding application No. PCT/US2013/078459, 2 pgs.

*Primary Examiner* — Ian J Lobo
(74) *Attorney, Agent, or Firm* — Chamberlain Hrdlicka

(57) ABSTRACT

A system, method, and sensor tool for enhancing sensor effectiveness. A wave is received utilizing multiple sensors in a downhole tool. Hodogram analysis of the wave is performed in response to measurements from the multiple sensors. A direction associated with the wave is determined. The multiple sensors are rotated to best sense the wave in response to the direction associated with the wave.

23 Claims, 5 Drawing Sheets

(56) References Cited

U.S. PATENT DOCUMENTS

| | | |
|---|---|---|
| 2007/0107937 A1 | 5/2007 | Sugiura |
| 2007/0215345 A1* | 9/2007 | Lafferty .................. E21B 43/26 166/250.1 |
| 2008/0130407 A1* | 6/2008 | Akhtar ..................... G01V 1/42 367/9 |
| 2010/0265795 A1* | 10/2010 | Johnson ................... G01V 1/44 367/32 |
| 2012/0046871 A1 | 2/2012 | Naville et al. |
| 2015/0212224 A1* | 7/2015 | Williams ................. G01V 1/40 702/14 |
| 2015/0308864 A1* | 10/2015 | Paulsson .................. G01V 1/48 73/152.16 |

* cited by examiner

ROTATING SENSOR MECHANISM FOR SEISMIC WHILE DRILLING SENSORS

BACKGROUND

Computational, measurement, and simulation processes for determining natural resource reserves and production have improved significantly in recent years. Retrieved data and measurements may be utilized to implement exploration or production actions, predictions, and schemes. In many cases, determinations of reservoir characteristics, properties, and information are determined utilizing logging-while-drilling (LWD) measurement-while-drilling (MWD) or seismic-while-drilling (SWD) tools and sensors. Making measurements downhole may be complicated by noise, infidelity, directional issues, or other interference. Typically tool providers and users have relied on increased signal sensitivity or brute processing power, at significant added cost and expense, to overcome issues.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system, method, and sensor tool for rotating sensors to optimize sensor readings. The illustrative embodiments may be utilized in natural resource exploration, measurements, and analysis. In one embodiment, a number of sensors may be positioned orthogonally in two or three dimensions within a sensor tool. An incoming wave or signal may be sensed by the sensors. Hodogram analysis may be performed on the incoming wave to determine a direction associated with the wave. The sensors may be rotated or moved in two or three dimensions to optimize or maximize reception of the wave by the sensors. As a result, the signal-to-noise ratio may be improved.

The illustrative embodiments may be performed for one set of sensors or a number of different sensors, sensor systems, or sensor modules. For example, the described methods and sensor tools may be useful in the event that one or more sensors fail. The sensors may be moved or rotated to compensate for one or more failed sensors. The illustrative embodiments may be utilized in a seismic-while drilling tool, measurement-while-drilling tool, logging tool, or other downhole tool.

The illustrative embodiments may be implemented in hardware, software, firmware or a combination thereof. For example, logic may be configured to determine a direction of a wave in response to measurements received and give instructions for actuating the motors connected to the sensors to rotate the sensors in the desired direction for sensing the incoming wave. Similarly, a set of instructions may be executed to reposition the sensors in response to distinct waves sensed by the sensors.

Figure 1A:
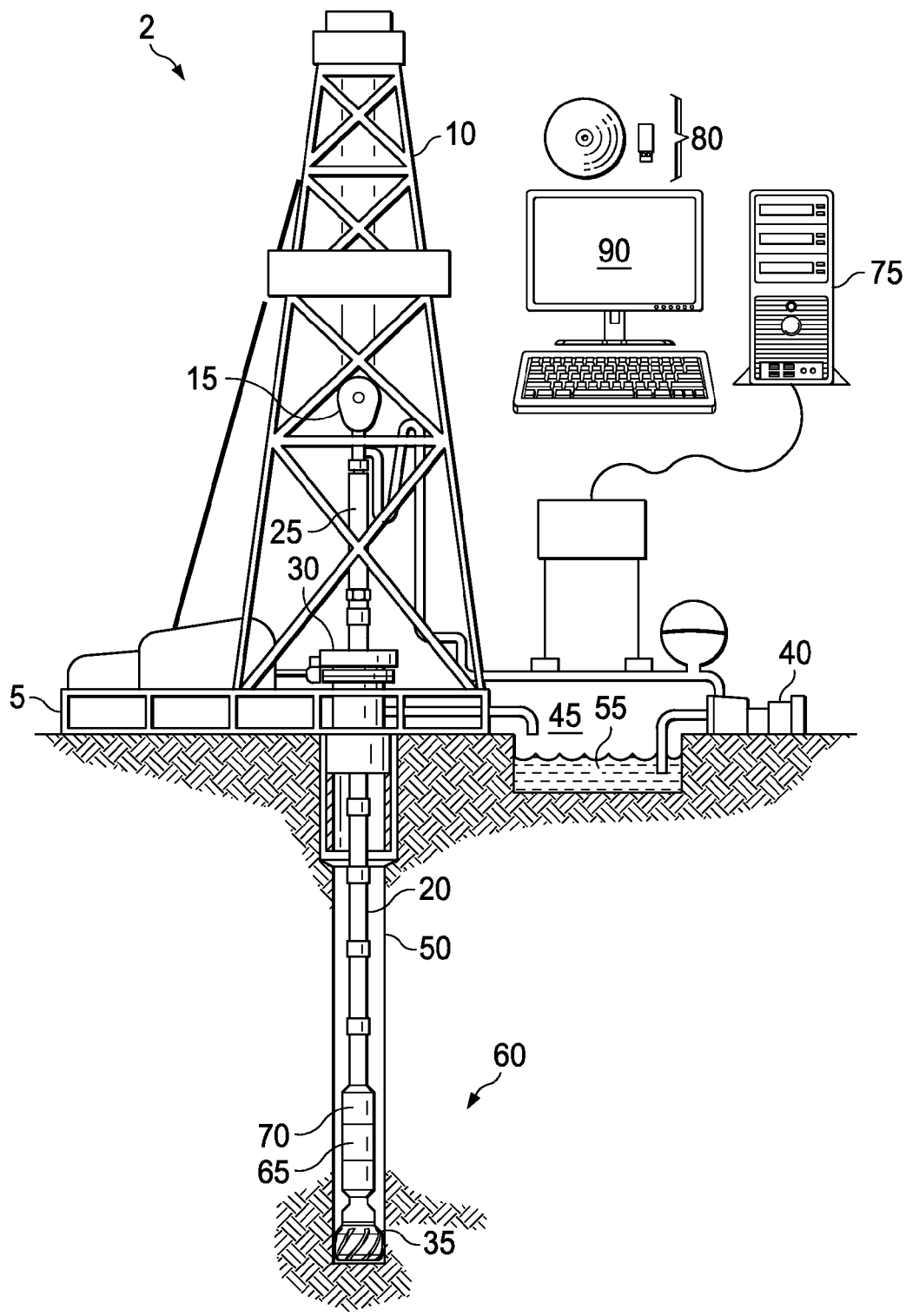
FIG. 1A is a schematic representation of a logging-while-drilling environment in accordance with an illustrative embodiment.

FIG. 1A shows an illustrative logging-while-drilling environment 2. LWD may also be referred to as measurement while drilling (MWD). A drilling platform 5 is equipped with a derrick 10 that supports a hoist 15. The rig operator drills an oil or gas well for production or exploration. The hoist 15 suspends a top drive 25 that rotates the drill string 20 as it lowers the drill string 20 through the wellhead 30. Connected to the lower end of the drill string 20 is a drill bit 35. The drill bit 35 is rotated and drilling accomplished by rotating the drill string 20, by use of a downhole motor near the drill bit 35 or the top drive 25, or by both methods.

In one embodiment, recirculation equipment 40 pumps drilling or other fluids through supply pipe 45, through top drive 25, and down through the drill string 20 at high pressures and volumes to emerge through nozzles or jets in the drill bit 35. The drilling fluid then travels back up the hole via the annulus formed between the exterior of the drill string 20 and the borehole wall 50, through a blowout preventer, and into a retention pit 55, reservoir, or enclosed receptacle on the surface. On the surface, the drilling fluid may be cleaned and then recirculated by the recirculation equipment 40. The drilling fluid may be utilized to carry cuttings from the base of the bore to the surface and balance the hydrostatic pressure in the rock formations in the LWD environment 2.

The bottomhole assembly 60 (i.e., the lowermost part of drill string 20) may include thick-walled tubulars called drill collars, which add weight, stability, and rigidity to aid the drilling process. The thick walls of these drill collars make them useful for housing instrumentation, tools, and sensors. For example, the bottomhole assembly 60 of FIG. 1 may include the sensor system 65 and a communications and control module 70.

The sensor system 65 may include a number of sensors that rotate to best sense one or more incoming waves. The sensor system 65 may be encompassed in a downhole tool or sub. In one embodiment, the sensor system 65 may include a protective housing for protecting the internal electrical and mechanical components of the sensor system 65 that may include motors, batteries, sensors, hubs, processors, chipsets, transceivers, leads, wires, or so forth.

In one embodiment, the sensor system 65 may be positioned away from the drill bit 35 to avoid potential noise and signal interference. However, in other embodiments, the sensor system 65 may be integrated with the drill bit 35 or be part of the drill string 20 that sits just above the drill bit 35. Various configurations of a drill string, 20 drilling apparatus, and sensor system 65 are shown and described herein. The sensor system 65 may be useful for compensating for waves that are received by the sensor system 65 from any number of directions based on the location and orientation of the bottomhole assembly 60.

In addition, the bottomhole assembly 60 may include a natural gamma ray detector, a resistivity tool, a nuclear magnetic resonance tool, a neutron porosity tool, or other exploration, logging, or sensory tools. Other tools and sensors may also be included in the bottomhole assembly 60, including position sensors, orientation sensors, accelerometers, compasses, pressure sensors, temperature sensors, vibration sensors, and so forth.

From the various bottomhole assembly 60 sensors, the communications and control module 70 (telemetry module) collects data regarding the formation properties or various drilling parameters, tool configurations and readings, and may stores the data in internal memory. In addition, some or all of the data may be transmitted to the surface by wireline communications, wireless communications, magnetic communications, seismic communications, or so forth.

For example, the communications and control module 70 may communicate information to the surface. The data may be communicated through the pipes and components of the drill string 20, wires integrated with or attached to the drill string, or separate wire, fiber optics, or other wired or wireless connections. The communications signals may be received, converted to an appropriate format, and processed into data by one or more computing or communications devices. Computer 75 operates in accordance with software (which may be stored on information storage media 80) and user input received via an input device to process and decode the received signals. The resulting sensory and telemetry data may be further analyzed and processed by computer 75 to generate a display of useful information on a computer monitor 80 or some other form of a display device. For example, a driller may employ the system of the LWD environment 2 to obtain and view data, information, and measurements for the borehole wall 50 or downhole components, structures, or formations.

Figure 1B:
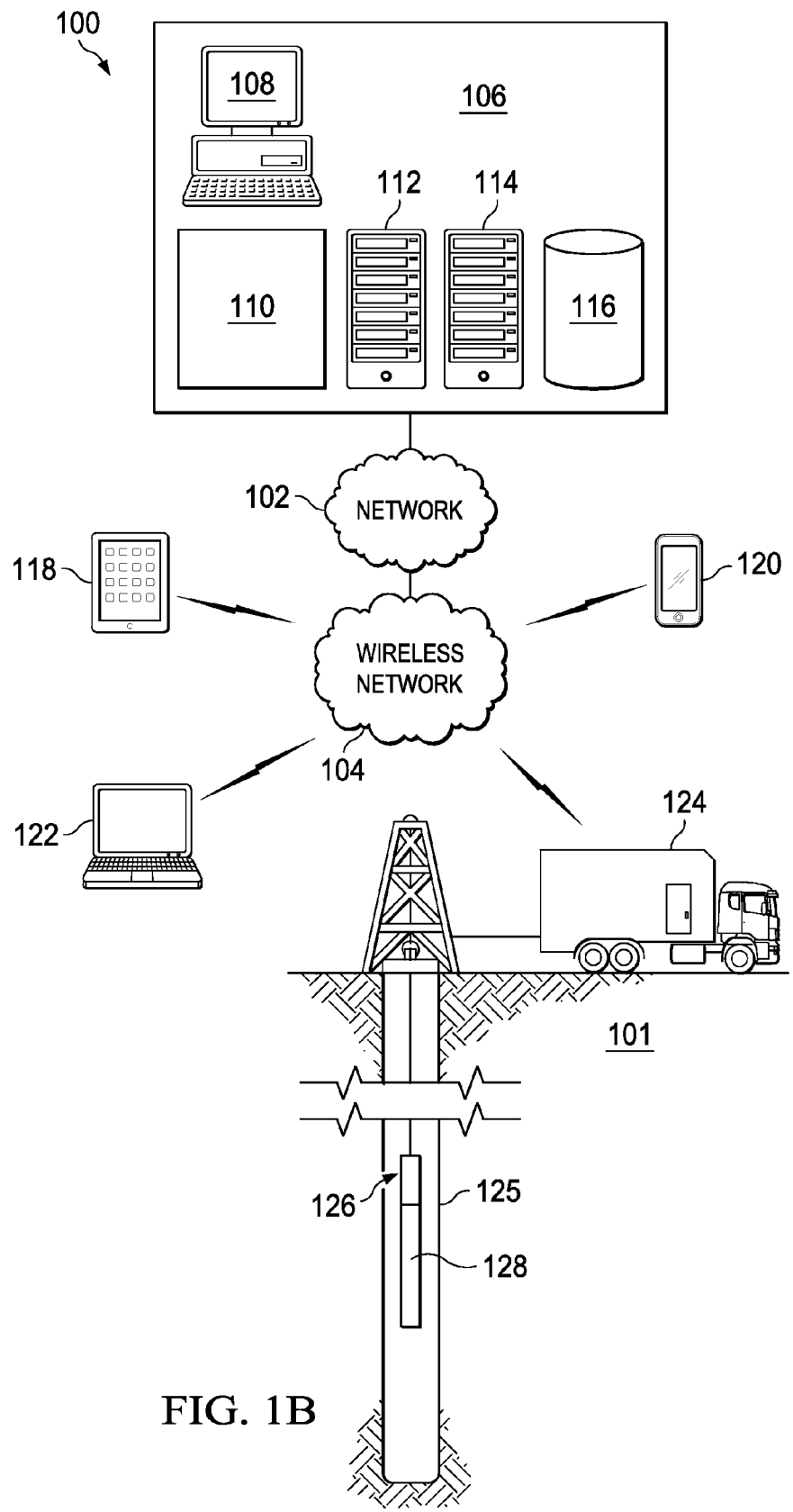
FIG. 1B is a schematic representation of a wireline logging environment in accordance with an illustrative embodiment.

FIG. 1B is a wireline logging environment 100 in accordance with an illustrative embodiment. The wireline logging environment 100 may include a number of tools, devices, locations, systems, and equipment that may be utilized to provide the sensor tools, systems, and methods herein described. The wireline logging environment 100 may also include a reservoir 101. The reservoir 101 is a designated area, location, or three-dimensional space that may include natural resources, such as crude oil, natural gas, or other hydrocarbons. The illustrative embodiments may utilize measurement, computational, and statistical analysis that may be performed by any number of devices in any number of locations. For example, the computations may be performed downhole, on-site, off-site, at a movable location, at a headquarters, utilizing fixed computational devices, or utilizing wireless devices.

In one embodiment, the process may be performed utilizing specialized sensor tools, including sensors, logic, interconnects, power sources, and other similar electrical components. The logic may be processors, memories, field programmable gate arrays (FPGAs), application specific integrated circuits, computer instructions, code, programs, or applications, or any combination of software, hardware, and firmware.

In one embodiment, the wireline logging environment 100 may include a network 102, a wireless network 104, a facility 106, a personal computer 108, a management system 110, servers 112 and 114, a database 116, a tablet 118, a wireless device 120, a laptop 122, and a mobile computing system 124. The mobile computing system 124 may include downhole equipment 126 and tool 128.

The network 102 may be any type of computing or communications network including one or more of the following networks: a wide area network, a local area network, one or more private networks, the Internet or public networks, a telephone network (e.g. publicly switched telephone network), one or more cellular networks, cloud networks, virtual networks, and other wireless and data networks.

The wireless network 104 is one example of a wireless network for regional or local communications (e.g. WiFi, 4G, LTE, PCS, Bluetooth, Zigbee, WiMAX, GPRS, etc.). The network 102 and the wireless network 104 may include any number of network nodes, devices, systems, equipment, and components (not depicted), such as routers, servers, network access points/gateways, cards, lines, wires, switches, DNS servers, proxy servers, web servers, and other network nodes and devices for assisting in routing and computation of data/communications as herein described.

In one embodiment, integrated or external components of the mobile computing system 124 may be configured to penetrate the reservoir 101 through a wellbore 125 to stimulate, energize, and measure parameters of a formation. One or more sensors or logging tools (e.g. probes, drill string measurement devices, nuclear magnetic resonance imagers, etc.) may be integrated with or connected to the download equipment 126 and tool 128 communicating with the mobile computing system 124 to perform measurements, logging, data retrieval, data storage, processing, and information display. For example, the mobile computing system 124 may determine any number of static and dynamic properties. The static and dynamic properties may include measurements of or changes in pressure, depth, temperature, composition (e.g. hydrocarbon composition levels, measurements, and statistics), fluid flow rate, fluid composition, density, porosity, position and displacement, depth, and so forth.

The tool 128 may represent any number of measurement-while-drilling (MWD), seismic-while-drilling (SWD), wireline tool, logging-while-drilling (LWD) tools, or other downhole or reservoir tools. The tool 128 may also be conveyed by slickline or coiled tubing. In one embodiment, the tool 128 may rotate sensors within the tool to increase the signal-to-noise ratio and enhance measurements made by the tool 128. In one embodiment, the tool 128, downhole equipment 126, or mobile computing system 124 may utilize Hodogram analysis for rotating receiver components. A Hodogram is a plot of seismic amplitudes recorded in a plane as a function of time. The tool 128 may rotate receiver components so that data traces appear as though one receiver was oriented toward the source (i.e. incoming wave) at the time of recording. For example, Hodogram analysis may be utilized to determine the angle to which the receiver components are to be rotated so that the data read by the sensors appears to have been recorded with one of the components perpendicular to the wave motion and the other parallel to the direction of the wave motion. The rotation of the sensors may result in a new set of coordinate axes or sensing axes (for the receiver components) that represent the data. In one embodiment, each of the sensors in the tool 128 may be rotationally attached to a motor, hub, gears, servo, or other device configured to rotate the sensors in an established direction. The rotational attachment allows the sensors to rotate about one or more pivots or center points. Any number of bearing, hub, or low friction connections may be utilized to allow the sensors to rotate. Rotational logic or instructions may be included in the sensors, a controller, or separate logic.

The wave or signal utilized by the tool 128 to perform measurements may be generated by the tool 128 or received from any number of sources. In one embodiment, the waves are generated by a kinetic, seismic, or explosive tool integrated with the mobile computing system 124. In another embodiment, the tool 128 may generate acoustic signals that are then reflected back to the tool 128 to perform measurements. Seismic sources may be in the form of a Vibroseis, thumper truck airgun, plasma sound source, electromagnetic pulse energy source, and so forth.

The personal computer 108, tablet 118, wireless device 120, laptop 122, and mobile computing system 124 may execute a local program or app to retrieve and utilize the measurements acquired in the process herein described. In another embodiment, the tool computations and analysis may be performed by the management system 110, servers 112 and 114, or other network devices. For example, the user may submit information and parameters utilizing the wireless device 120 to perform the calculations on the server 112 with the results being stored in the database 116 for subsequent access. The database 116 may store the sensor orientation information, measurements, static properties, dynamic properties, flow simulation results (e.g. initial values, partial output, and completed output), parameters, configuration, settings, and so forth. The database 116 may be accessed by any number of users and devices in the flow simulation environment to retrieve and update the data.

In one embodiment, the servers 112 and 114 may execute an application that is available to any of the devices of the wireline logging environment 100 through the network 102 and the wireless network 104. For example, the application may display a user interface for receiving parameters, properties, and other information for reviewing the tool and Hodogram analysis. In one embodiment, the server 114 is a Web server that hosts the application for downhole measurement processing that is accessible through one or more browsers utilized by any of the personal computer 108, tablet 118, wireless device 120, laptop 122, and mobile computing system 124.

Figure 2:
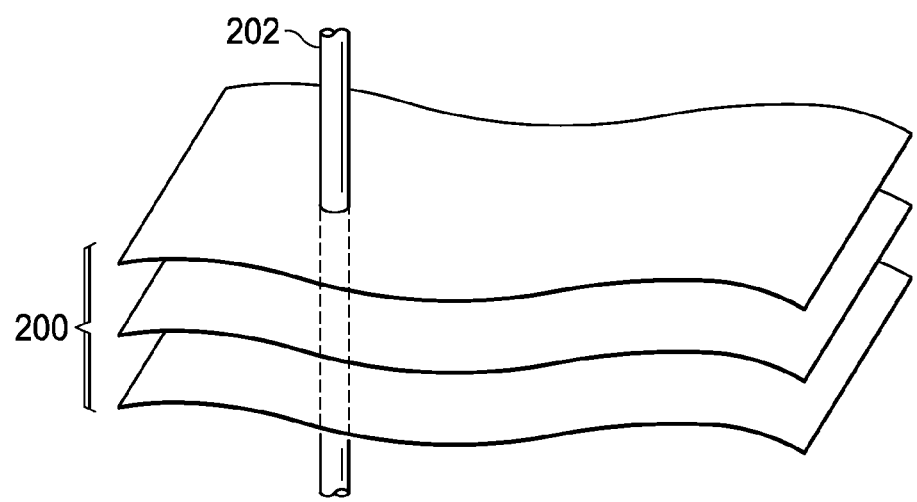
FIG. 2 is a schematic representation of earth formations penetrated by a wellbore in accordance with an illustrative embodiment.

FIG. 2 illustrates earth formation horizons 200 which are penetrated by a wellbore 202 in accordance with an illustrative embodiment. The earth formation horizons 200 may represent any number of surface conditions, environments, structures, or compositions. In one embodiment, the earth formation horizons 200 represent a reservoir that is undergoing measurements, analysis, or production actions. The wellbore 202 is drilled into the earth formation horizons 200 to extract wellbore fluids or gases from the formation. The size, shape, direction, and depth of the wellbore 202 may vary based on the conditions and estimated natural resources available. The wellbore 202 may include any number of support structures or materials, divergent paths, surface equipment, or so forth. In one embodiment, the measurements of the earth formation horizons may be determined by inserting a downhole tool or sensor as is shown in FIG. 1.

Figure 3:
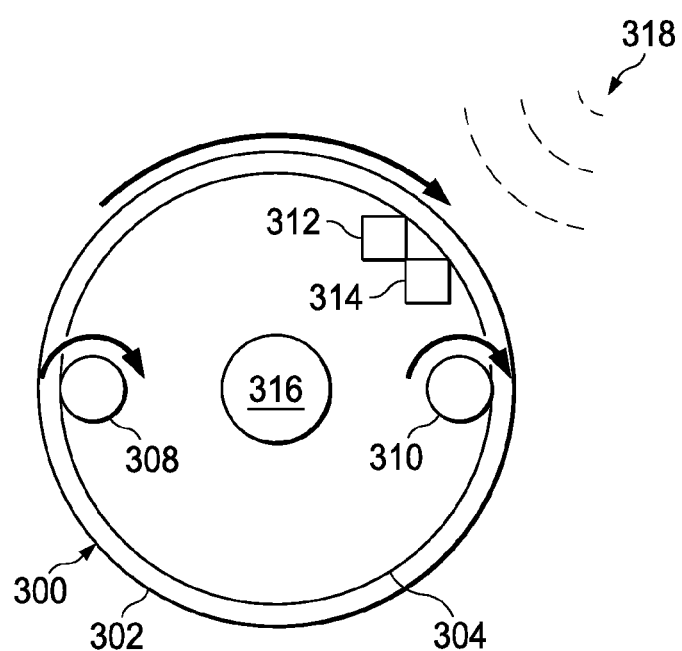
FIG. 3 is a schematic top view of a sensor tool in accordance with an illustrative embodiment.

FIG. 3 is a schematic top view of a sensor tool 300 in accordance with an illustrative embodiment. In one embodiment, the sensor tool 300 may include any number of components including a case 302, an inner frame 304, gears 308 and 310, sensor 312 and 314, and hub 316. The sensor tool 300 may be configured to sense waves 318 (i.e. seismic waves) as the waves 318 are received by the sensor tool 300. The sensor tool 300 may also illustrate all or portions of a sensing circuit or sensing circuitry or an application specific integrated circuit. The electrical components of the sensor tool 300 may be in communication with one another through any number of wires, busses, leads, traces, or so forth.

In one embodiment, the sensor tool 300 may be a standalone tool. In another embodiment, the sensor tool 300 may be integrated in a drill string, bottom hole assembly (BHA), logging tool, or other downhole system. As shown, the case 302 may be configured to protect the internal components of the sensor tool 300 against the downhole conditions. For example, the case 302 may be formed of stainless steel, Inconel, aluminum, plastics, polymers, or other similarly hardened materials. In one embodiment, the case 302 is completely sealed preventing unwanted liquids, gases, solids, or other mixtures from entering into the sensor tool 300. As a result, the case 302 may include any number of threaded end caps, access doors, ports, or interfaces for connecting the sensor tool 300 to external devices or for accessing the internal components. In one embodiment, the case 302 is cylindrically shaped. The case 302 may include any number of layers or seals to prevent unwanted seepage or penetration of the sensor tool 300.

In one embodiment, the sensor tool 300 may be powered by power components, such as a battery, fuel cell, or so forth (not shown). In other embodiments, the sensor tool 300 may be physically connected to one or more other components that provide wireline power and communications. For example, power may be provided from a surface station and a data connection may ensure that sensor measurements are communicated to the surface station as well. In another embodiment, the sensor tool 300 may be configured for wireless communications utilizing any number of signals, networks, protocols, or standards. The sensor tool 300 may communicate with other portions of a BHA, drill string, or to surface equipment.

The inner frame 304 may be configured to support the electrical components of the sensor tool 300. The inner frame 304 may be rotationally attached to the hub 316. In one embodiment, the inner frame 304 may include teeth (not shown). The teeth may allow the inner frame 304 to be rotated within the case 302. In one embodiment, the teeth may be driven by gears 308 and 310. The gears 308 and 310 may be connected to one or more servos, actuators, or motors (not shown) that drive their rotation. The inner frame 304 may also be driven magnetically, utilizing a single magnetic hub, bearing or roller drives or so forth. The inner frame 304 may also be driven utilizing a chain, a central motorized hub, or so on.

In one embodiment, the gears 308 and 310 are placed on opposite sides of the inner frame 304. In another embodiment, the gears 308 and 310 may represent motors that interact directly with the teeth. In one embodiment, the case 302 and the inner frame 304 may be cylindrically shaped and rotated about the hub 316 to face the seismic waves 318. In another embodiment, the case 302 and the inner frame 304 may be spherically shaped and may be configured to rotate in any three dimensional direction by the gears 308 and 310. For example, the gears 308 and 310 may be or may represent bearing drives that rotate together to position the inner frame 304 and corresponding sensors 312 and 314. The inner frame 304 may also be rotated utilizing any number or combination of hydraulics, electromagnetics, pneumatics, and mechanical linkages. Any number of bearings, sliders, rollers or other components may be utilized to ensure the smooth movement of the inner frame 304 within the case 302. The rotating movement of the sensor tool 300 may be accomplished utilizing any number of hydraulic, electromagnetic, pneumatic, and mechanical linkages and drives.

In one embodiment, the sensors 312 and 314 may be positioned as a pair. In another embodiment, the sensors 312 and 314 may be configured to rotate independently from each other regardless of the positioning of the sensor tool 300. In the different embodiments, the sensors 312 and 314 may also be configured to tilt allowing the sensors 312 and 314 to be pointed in any x, y, and z direction. In one embodiment, the sensor tool 300 may include one or more devices (e.g. gyroscope, compass, accelerometers, electromagnetic field sensor, magnetic field sensor, etc.) for determining the exact position, location, and orientation of each component of the sensor tool 300. For example, the relative angles of the sensor tool 300 as well as the sensors 312 and 314 may be determined. Positions may include x, y, and z directions, azimuth and inclination values and other associated information. In one embodiment, the sensors 312 and 314 may be connected to integrated logic on the sensor tool 300 for processing the data and other information. The position of the sensor tool 300 and the orientation of the sensors 312 and 314 may be utilized to reorient the sensors 312 and 314 in response to analyzing the incoming signal. The sensor tool 300 may include multiple pairs or sets of sensors similar to sensors 312 and 314.

In one embodiment, the electrical components of the sensor tool 300 may be implemented on an application specific integrated circuit (ASIC), specialized processor, or field programmable gate array (FPGA). As a result, the size of the sensor tool 300 may be reduced significantly. In another embodiment, a number of ASICs may be stacked or tied together as distinct sensor modules.

In one embodiment, the sensors 312 and 314 may represent a pair of seismic sensors. The sensors 312 and 314 may be configured to sense signals in an x direction and a y direction. In another embodiment, the sensor tool 300 may include a sensor configured to sense signals in a z direction as well. For example, the sensors 312 and 314 may represent geophones, hydrophones, accelerometers, piezo, laser, microelectromechanical (MEMS), fiber optic, or other sensors. The sensors 312 and 314 may communicate with one or more sensing circuits including analog and digital circuitry for processing the sensed signals. In one embodiment, the sensors 312 and 314 may be linked with an analog-to-digital converter that converts the signals to digital signals that may be processed by a processor, microcontroller, digital logic implementing a sensing algorithm, or a combination thereof. For example, the processor may execute a set of instructions stored in a memory to determine a direction of the wave front for repositioning the sensors 312 and 314 for maximum sensitivity.

In another embodiment, the sensor tool 300 may include a number of different sensors that may be configured to rotate independently to sense the waves 318. For example, the sensor tool 300 may include numerous sensor modules configured to rotate independently.

The position of the sensors 312 and 314 may be rotated to enable a higher signal to noise ratio. The sensor 312 and 314 may also be rotated with the inner frame 304 to ensure that the sensors 312 and 314 are in a first Fresnel zone. The first Fresnel zone is a volume where the waves interfere with each other constructively. In one embodiment, the direction of the wave front represented by waves 318 may be computed by utilizing Hodogram analysis. As a result, the sensors may be rotated to the desired direction. Rotation of the sensors 312 and 314 may be utilized to overcome vector infidelity for sensors (i.e. geophones) which is an undesirable effect of a wave being received parallel to a receiving surface or plane of one of the sensors 312 and 314 resulting in no or low reading of the wave.

The sensor tool 300 may also be configured to continue to operate if one of the sensors 312 and 314 stops operating. For example, the still operating sensor 314 may be rotated into position in response to sensor 312 becoming inoperative.

Various tools rely on sensor sensitivity and post-processing of sensor signals to best measure incoming signals. The illustrative embodiments utilize sensor positioning as a cost effective and simple way of improving the signal-to-noise ratio.

Figure 4A:
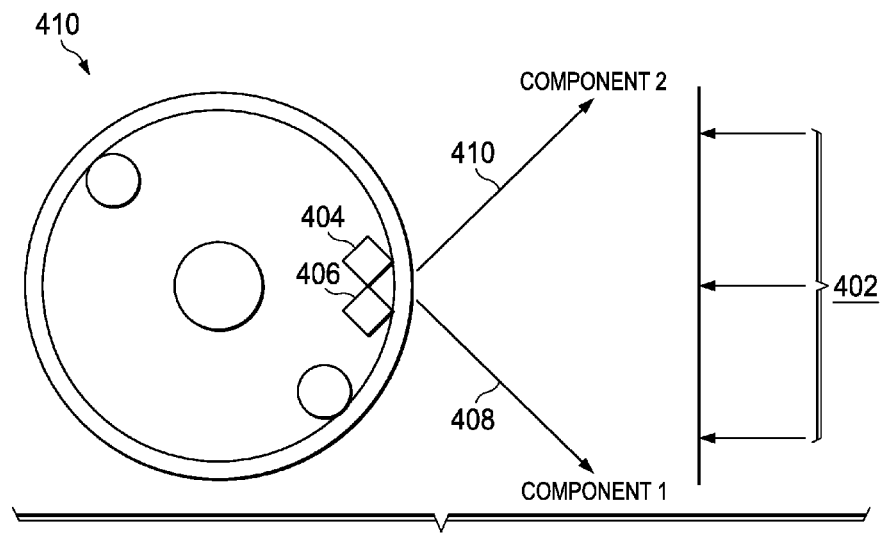
FIGS. 4A-4C are pictorial representation of sensor measurements in accordance with an illustrative embodiment.
Figure 4B:
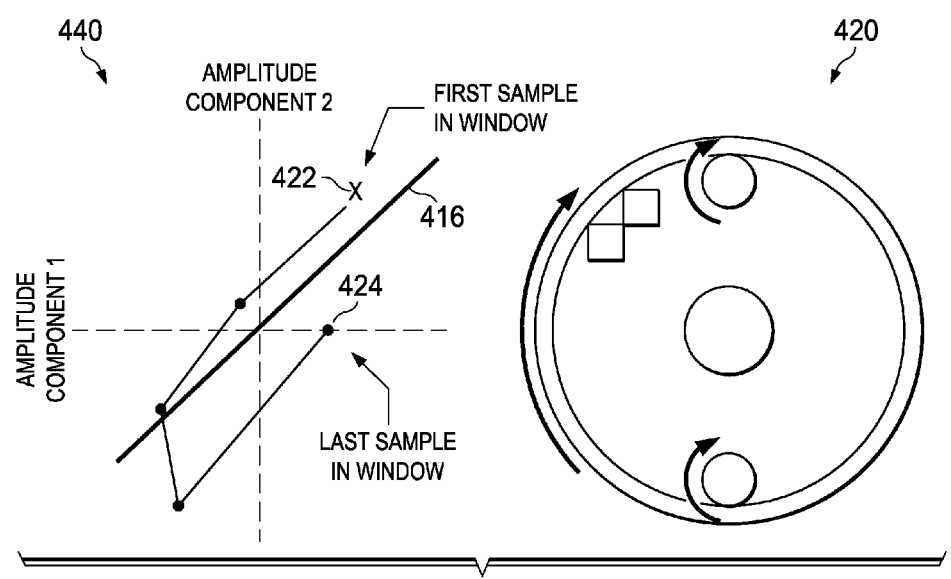
Figure 4C:
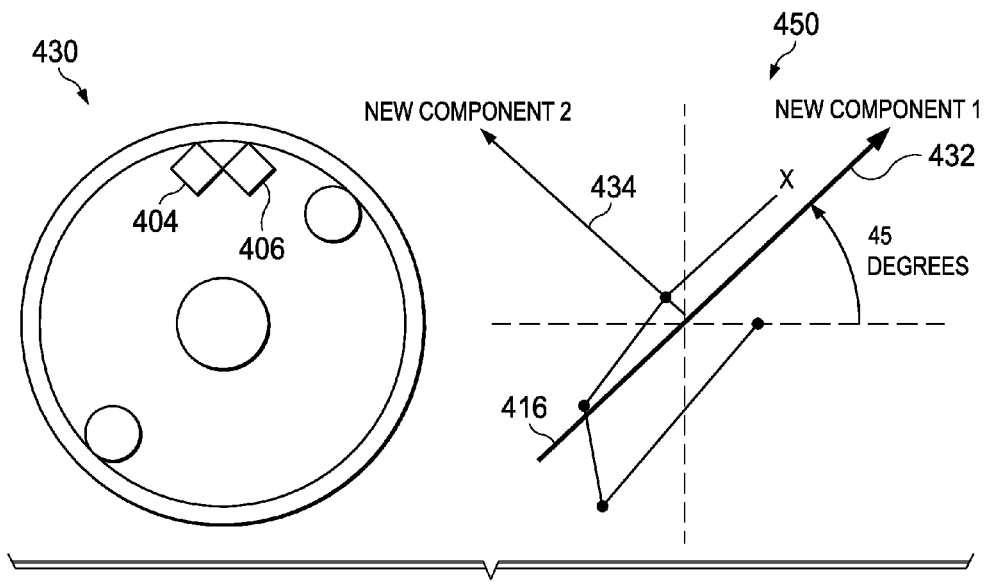

Turning now to FIGS. 4A-C, showing measurements being taken by a sensor tool 400 to perform Hodogram analysis. FIGS. 4A-C show the sensor tool 400 in a first position 410, a second position 420, and a third position 430. As previously described, Hodogram analysis may be utilized to determine the direction of a wave front 402. The Hodogram may represent a cross-plot of a first sensor 404 as compared to a second sensor 406. For example, the Hodogram plot may represent seismic amplitudes recorded in a plane as a function of time. As previously described, the first sensor 404 and the second sensor 406 each include receiver or signal components for sensing any number of incoming signals, waves, fields, conditions, or other parameters.

In one embodiment, the first sensor 404 and the second sensor 406 may be orthogonal sensors perpendicular to each other to enable Hodogram analysis. The sensors 404 and 406 may be affixed relative to one another. In another embodiment, the sensors 404 and 406 may be configured to rotate independently. The sensors 404 and 406 may be calibrated to ensure the Hodogram analysis method is valid and usable. As shown in FIG. 4A, the first sensor 404 may be configured to sense a first component 408 of the wave front 402 and the second sensor 406 may be configured to sense a second component 410 of the wave front 402. For example, the first component 408 may represent a first axis (e.g. x component) of the wave front 402 and the second component 410 may represent a second axis (e.g. y component) of the wave front 402. In another embodiment, another sensor may be included for sensing measurements from a third axis (e.g. z component). As a result, measurements may be made to sense the different wave components in distinct axes of the wave front 402 as it is first sensed.

The reading of the sensors 404 and 406 may allow a determination of the direction of the wave front 402 to rotate the sensors 404 and 406 (as shown in FIG. 4C) for maximizing signal quality regardless of the direction of the wave front 402. Graphs 440 and 450 show graphical analysis of the first component 408 and the second component 410 of the wave front 402.

As shown in FIG. 4A, two seismic receiver components represented by the first sensor 404 and the second sensor 406 may be positioned at right angles to one another with the seismic wave front 402 approaching at a 45 degree angle to both sensors 404 and 406. The first component 408 and the component 410 represent the portions of the wave front 402 that correspond to a first axis measured by the sensor 404 and a second axis measured by the sensor 406.

As shown in FIG. 4B, a cross plot, such as graph 440 may be generated. The dots on graph 440 represent data that may be recorded by the first sensor 404 and the second sensor 406. For example, each dot in the graph 440 (Hodogram) is a plot of the amplitude of a first component 408 in contrast to the amplitude of a second component 410 within a given time sample. For example, the dots on the graph 440 may represent numerous sequential samples from the recorded data traces. The first time sample 422 in the time window of graph 440 is marked by an X and sequential samples are connected with a line to a last sample 424.

A best fit line 416 may be plotted utilizing the data samples shown in the graph 440 to determine the general direction of the wave front 402. As shown, the wave front 402 may be perpendicular to the best fit line 416 read from the measurements by the first sensor 404 and second sensor 404. The best fit line 416 may be determined by linear regression or other similar techniques. As shown in FIG. 4C, a receiver surface or sensing axis of the first sensors 404 and the second sensor 404 may be rotated to the location 430 to be perpendicular to new components 432 and 434 of the wave front 402 to maximize sensitivity to energy of the wave. The third position 430 corresponds to the new components 432 and 434 that are associated with the best fit line 416. For example, new component 432 is directionally the same as (parallel) the best fit line 416 and new component 434 is perpendicular to the best fit line 416.

One purpose of Hodogram analysis is to determine the angle through which the sensors 404 and 406 may need to be rotated so that the sensor readings are performed with the sensor components 408 and 410 are perpendicular with sensing axes of the sensors 404 and 406. FIGS. 4B and 4C shows the rotation of the sensors 404 and 406 from the second position 420 to the third position 430 that results in a new set of sensing axes for the sensors 404 and 406 to receive data. For example, FIG. 4C shows the sensors 404 and 406 in a third position 430 with their sensing axes orthogonal to the new set of components 432 and 434, respectively. The third position 430 maximizes the sensitivity of the sensors 404 and 406 by orienting the sensing axes perpendicular to the new first component 423 and the new second component 434. Although not shown, the illustrative embodiments may utilize data from an array of sensors associated with two or three components or axes representing either two or three dimensions based on the tool configuration and preferences of the operator. As with other three component tools, the traces may be travelling together in the process flow. Any number of trace sorting systems, algorithms, or protocols may be implemented.

Figure 5:
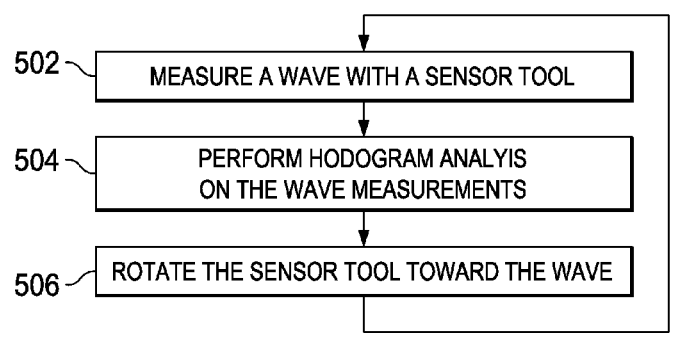
FIG. 5 is a flowchart of a process for performing sensor orientation in accordance with an illustrative embodiment.

FIG. 5 is a flowchart of a process for performing sensor orientation in accordance with an illustrative embodiment. In one embodiment, the process of FIG. 5 may be implemented by a sensor tool or system as is herein described.

The process may begin with the system measuring a wave with a sensor tool (step 502). The sensor tool may have previously been sent downhole and turned on to begin taking sensor measurements.

Next, the system performs Hodogram analysis on the wave measurements (step 504). For example, a least square method may be utilized to determine a best fit line. The direction of the incoming wave front may be determined to be perpendicular to the best fit line or data. In one embodiment, the Hodogram analysis is performed by the sensor tool. In another embodiment, the measurements may be communicated externally to perform analysis. The communications may be through wireline or wireless media. The Hodogram analysis may be performed with two or more wave samples or readings. The Hodogram plots and mathematical analysis may be performed continuously based on new sensor positions, tool position, downhole material changes, wave reconfiguration and so forth.

Next, the system rotates the sensor tool toward the wave (step 506). The sensor tool may be rotated to improve the signal-to-noise ratio. In one embodiment, the sensor tool may include two or more sensor modules that may be utilized for redundancy. The sensor modules may be readjusted, oriented, or rotated in response to one sensor module failing. The direction and magnitude sensed by the sensor tool may be communicated to other components of the system or for external processing.

A system, method, and sensor tool for enhancing sensor effectiveness. A wave is received utilizing multiple sensors in a downhole tool. Hodogram analysis of the wave is performed in response to measurements from the multiple sensors. A direction associated with the wave is determined. The multiple sensors are rotated to best sense the wave in response to the direction associated with the wave.

The wave may be a seismic wave received in a wellbore. The downhole tool may be selected from the group consisting of a drill string, a logging-while-drilling tool, a seismic-while-drilling-tool, a wireline tool, a tool conveyed by slickline or coiled tubing, and a measurement while drilling tool. A best fit line may be determined utilizing a least square method. The direction may be perpendicular to a line associated with the least squares fit. The multiple sensors may be positioned orthogonally to each other. The multiple sensors may perform measurements in a distinct axis. The multiple sensors may be rotated to improve the signal to noise ratio. The multiple sensors are rotated in an x direction and a y direction. The multiple sensors may be rotated in three dimensions to sense the wave. The rotation of the multiple sensors may be performed to compensate for one or more of the multiple sensors having failed.

Another embodiment provides a sensing tool. The sensing tool may include a number of sensors. The sensing tool may include a sensing circuit in communication with the number of sensors. The sensing circuit is programmed with logic to receive measurements from the number of sensors, perform Hodogram analysis of waves sensed by the number of sensors utilizing the measurements, and determine a direction associated with the waves. The sensing tool may also include one or more motors connected to the number of sensors and in communication with the logic. The logic of the sensing circuit is further programmed to actuate the one or more motors to rotate the plurality of sensors.

The sensing tool may be an ASIC. The number of sensors may be rotated in two dimensions or three dimensions. The logic is further programmed to rotate the number of sensors to increase the signal-to-noise ratio. The Hodogram analysis may include determining a best fit line. The direction may be perpendicular to the best fit line.

Another embodiment provides a sensor tool. The sensor tool may include a case encompassing electrical components of the sensor tool. The sensor tool may also include a number of sensor rotationally secured within the case. The sensor tool may also include logic in communication with the number of sensors. The logic may receive measurements from the number of sensors, perform Hodogram analysis of waves sensed by the number of sensors utilizing the measurements, and determine a direction associated with the waves. The sensor tool may include one or more motors in communication with the logic. The one or more motors may rotate the number of sensor toward the waves.

The one or more motors may rotate the sensors utilizing one or more gears. The sensor tools may also be rotated utilizing hydraulics, electromagnetics, pneumatics, mechanical linkages, or a combination thereof. The number of sensors may be rotated to increase the signal to noise ratio. The sensor tool may further include a number of sensor modules housing the number of sensors. The number of sensor modules may rotate independently to sense the waves. The Hodogram analysis may include determining a best fit line. The direction may be perpendicular to the best fit line. The Hodogram analysis may include determining a best fit line. The direction may be perpendicular to the best fit line. The sensor tool may further include a case with the plurality of sensors rotationally secured within the case. The sensor tool may include one or more motors connected to each of the number of sensors by one or more gears for rotating the number of sensors. The number of sensors may communicate with the logic. The logic may be further programmed to provide commands to actuate the one or more motors thereby rotating the plurality of sensors to increase the signal to noise ratio. The sensor tool may further include a number of sensor modules housing the number of sensors. The number of sensor modules may rotate independently to sense the waves.

Yet another embodiment provides a system for drilling a well. The system may include a drilling rig and a drill string including a drill bit and a bottom hole assembly. The bottom hole assembly may include a telemetry module and a sensor tool. The sensor tool may include a number of sensors and a sensing circuit in communication with the number of sensors. The sensing circuit may be programmed with logic to receive measurements from the number of sensors, perform Hodogram analysis of waves sensed by the number of sensors utilizing the measurements, determine a direction associated with the waves, and determine a direction associated with the waves. The sensor tool may include one or more motors connected to the number of sensors and in communication with the logic. The sensing circuit may be further programmed with logic to actuate the one or more motors to rotate the number of sensors.

The system may be programmed with logic to receive seismic measurements with the number of sensors from a remote source. The number of sensors include at least a first sensor and a second sensor positioned with a first sensing axis of a first sensor orthogonal to a second sensing axis of the second sensor. The sensor circuit is further programmed with logic to rotate the number of sensors independently.

In other embodiments of the system, method, sensor circuit, and sensor tool may include any of the following additional components, functionality, features, or additions. One of the number of sensors may be rotated so that a sensing axis is parallel to a first component of the waves and a sensing surface of the one of the number of sensors is perpendicular to a second component of the waves. One of the number of sensors may be rotated so that a sensing axis of the sensor is perpendicular to the direction of the wave. A second sensor may sense secondary waves. The number of sensors may be configured to sense primary waves and secondary waves.

In the previous embodiments, reference is made to the accompanying drawings that form a part hereof. These embodiments are described in sufficient detail to enable those skilled in the art to practice the invention, and it is understood that other embodiments may be utilized and that logical, structural, mechanical, electrical, and chemical changes may be made without departing from the scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The previous detailed description is of a small number of embodiments for implementing the invention and is not intended to be limiting in scope. The following claims set forth a number of the embodiments of the invention disclosed with greater particularity.

What is claimed:

1. A method for enhancing sensor effectiveness in a downhole tool, the method comprising:
    receiving a wave utilizing a plurality of sensors in the downhole tool;
    performing a Hodogram analysis of the wave in response to measurements from the plurality of sensors;
    determining a direction associated with the wave; and
    rotating the plurality of sensors to best sense the wave in response to the direction associated with the wave.

2. The method according to claim 1, wherein the wave is a seismic wave received in a wellbore, and wherein the downhole tool is a seismic-while-drilling tool.

3. The method according to claim 1, wherein the downhole tool is selected from the group consisting of a drill string, a wireline tool, a logging-while-drilling tool, a seismic-while-drilling-tool, and a measurement while drilling tool.

4. The method according to claim 1, wherein performing the Hodogram analysis further comprises determining a best fit line utilizing a least square method, wherein the direction is perpendicular to a line associated with the least squares fit.

5. The method according to claim 1, wherein the plurality of sensors are positioned orthogonally to each other.

6. The method according to claim 5, wherein each of the plurality of sensors performs measurements in a distinct axis.

7. The method according to claim 1, wherein rotating the plurality of sensors improves the signal to noise ratio.

8. The method according to claim 1, wherein the plurality of sensors are rotated in an x direction and a y direction.

9. The method according to claim 1, wherein the plurality of sensors are rotated in three dimensions to sense the wave.

10. The method according to claim 1, wherein the rotating is performed to compensate for one or more of the plurality of sensors that have failed.

11. A sensing tool for natural resource exploration comprising:
    a plurality of sensors;
    a sensing circuit in communication with the plurality of sensors, wherein the sensing circuit is programmed with logic to:
        receive measurements from the plurality of sensors,
        perform Hodogram analysis of waves sensed by the plurality of sensors utilizing the measurements, and
        determine a direction associated with the waves; and
    one or more motors connected to the plurality of sensors and in communication with the logic, wherein the logic of the sensing circuit is further programmed to actuate the one or more motors to rotate the plurality of sensors.

12. The sensing tool according to claim 11, wherein the sensing circuit is an application specific integrated circuit.

13. The sensing tool according to claim 11, wherein the plurality of sensors are rotatable in two dimensions or three dimensions.

14. The sensing tool according to claim 11, wherein the logic is further programmed to rotate the plurality of sensors to increase a signal-to-noise ratio in response to commands received.

15. The sensing tool according to claim 11, wherein the Hodogram analysis include determining a best fit line, and wherein the direction is perpendicular to the best fit line.

16. The sensing tool according to claim 11, further comprising:
    a case wherein the plurality of sensors are rotationally secured within the case.

17. The sensing tool according to claim 16, further comprising:
    one or more motors connected to each of the plurality of sensors by one or more gears for rotating the plurality of sensors.

18. The sensing tool according to claim 11, wherein the plurality of sensors communicate with the logic, and wherein the logic is further programmed to provide commands to actuate the one or more motors thereby rotating the plurality of sensors to increase the signal to noise ratio.

19. The sensing tool according to claim 16, further comprising:
a plurality of sensor modules housing the plurality of sensors, wherein the plurality of sensor modules rotate independently to sense the waves.

20. A system for drilling a well, comprising:
a drilling rig; and
a drill string comprising a drill bit and a bottom hole assembly, the bottom hole assembly comprising:
a telemetry module; and
a sensor tool, the sensor tool comprising:
a plurality of sensors;
a sensing circuit in communication with the plurality of sensors,
wherein the sensing circuit is programmed with logic to:
receive measurements from the plurality of sensors,
perform Hodogram analysis of waves sensed by the plurality of sensors utilizing the measurements, and
determine a direction associated with the waves; and
one or more motors connected to the plurality of sensors and in communication with the logic, wherein the sensing circuit is further programmed with logic to actuate the one or more motors to rotate the plurality of sensors.

21. The system according to claim 20, wherein the sensor circuit is further programmed with logic to receive seismic measurements with the plurality of sensors from a remote source.

22. The system according to claim 20, wherein the plurality of sensors include at least a first sensor and a second sensor positioned with a first sensing axis of a first sensor orthogonal to a second sensing axis of the second sensor.

23. The system according to claim 20, wherein the sensor circuit is further programmed with logic to rotate the plurality of sensors independently.

* * * * *